US009832413B2

(12) United States Patent
Sandland et al.

(10) Patent No.: US 9,832,413 B2
(45) Date of Patent: Nov. 28, 2017

(54) AUTOMATED CHANNEL DETECTION WITH ONE-WAY CONTROL OF A CHANNEL SOURCE

(71) Applicant: Google Inc., Mountain View, CA (US)

(72) Inventors: Nathan Leslie Sandland, Mountain View, CA (US); Jason Bayer, Mountain View, CA (US); Dennis Miloseski, Mountain View, CA (US); Majd Bakar, Mountain View, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 14/089,709

(22) Filed: Nov. 25, 2013

(65) Prior Publication Data
US 2014/0085541 A1 Mar. 27, 2014

Related U.S. Application Data

(63) Continuation-in-part of application No. 13/623,043, filed on Sep. 19, 2012.

(51) Int. Cl.
H04N 5/50 (2006.01)
H04N 21/44 (2011.01)
H04N 21/482 (2011.01)

(52) U.S. Cl.
CPC ......... H04N 5/50 (2013.01); H04N 21/44008 (2013.01); H04N 21/4823 (2013.01)

(58) Field of Classification Search
CPC . H04N 21/44008; H04N 21/4823; H04N 5/50
(Continued)

(56) References Cited

U.S. PATENT DOCUMENTS 5,355,162 A * 10/1994 Yazolino ............ H04N 5/44543
348/555
6,658,662 B1 * 12/2003 Nielsen .................... H04N 7/16
348/E7.054

(Continued)

FOREIGN PATENT DOCUMENTS

EP 2464103 A2 6/2002

OTHER PUBLICATIONS

Google Inc., International Search Report and Written Opinion, PCT/US2013/060697, dated Mar. 19, 2014, 14 pgs.
(Continued)

Primary Examiner — Nathan Flynn
Assistant Examiner — Tung T Trinh
(74) Attorney, Agent, or Firm — Morgan, Lewis & Bockius LLP

(57) ABSTRACT

Features of various implementations are used to enable delivery of matched functionality, content and/or services, as a part of an interactive television suite of technologies. In some implementations, a content delivery process is enabled so that communication between the primary TV receiver and a supplemental set-top box is reduced in order to avoid the need for one or more provider-specific APIs. For example, one aspect of the disclosure is a method of identifying a media program by capturing display data from the media program, and extracting text from the display data in response to determining that the display data includes the text overlay, wherein the extracted text is associated with the media program. In some implementations, a supplemental set-top box is configured to operate a primary TV receiver, without a provider-specific API, in order to determine the channel line-up available to a particular subscriber through the primary TV receiver.

18 Claims, 8 Drawing Sheets

(58) Field of Classification Search
USPC .................................................. 725/14, 39
See application file for complete search history.

(56) References Cited

U.S. PATENT DOCUMENTS

| | | | | |
|---|---|---|---|---|
| 6,742,183 | B1* | 5/2004 | Reynolds | H04N 5/44543 348/E5.105 |
| 7,031,553 | B2* | 4/2006 | Myers | G06K 9/3258 382/174 |
| 7,113,230 | B1* | 9/2006 | Genovese | H04N 5/4401 348/731 |
| 7,134,131 | B1* | 11/2006 | Hendricks | H04N 5/44543 348/E5.105 |
| 7,620,268 | B2 | 11/2009 | Myers et al. | |
| 7,664,317 | B1* | 2/2010 | Sowerby | G06T 7/0002 382/162 |
| 7,991,801 | B2 | 8/2011 | Chen et al. | |
| 8,006,268 | B2 | 8/2011 | Sloo | |
| 9,113,202 | B1* | 8/2015 | Wiseman | H04L 7/08 |
| 2003/0004914 | A1 | 1/2003 | McGreevy | |
| 2004/0075692 | A1 | 4/2004 | Matichuk | |
| 2004/0183947 | A1* | 9/2004 | Lee | H04N 5/50 348/570 |
| 2004/0201720 | A1 | 10/2004 | Robins et al. | |
| 2004/0239809 | A1* | 12/2004 | Kim | H04N 5/44543 348/563 |
| 2004/0260621 | A1 | 12/2004 | Foster et al. | |
| 2005/0020238 | A1* | 1/2005 | Eastman | H04H 20/28 455/403 |
| 2005/0123200 | A1 | 6/2005 | Myers et al. | |
| 2005/0177847 | A1* | 8/2005 | Konig | G06F 17/30802 725/41 |
| 2005/0201619 | A1 | 9/2005 | Sun et al. | |
| 2006/0026128 | A1 | 2/2006 | Bier | |
| 2006/0265731 | A1 | 11/2006 | Matsuda | |
| 2007/0073704 | A1 | 3/2007 | Bowden et al. | |
| 2007/0186228 | A1 | 8/2007 | Ramaswamy et al. | |
| 2007/0192910 | A1 | 8/2007 | Vu et al. | |
| 2008/0028424 | A1* | 1/2008 | Cho | H04N 5/44513 725/38 |
| 2008/0097984 | A1* | 4/2008 | Candelore | G06F 17/30253 |
| 2008/0098426 | A1* | 4/2008 | Candelore | H04N 5/4403 725/38 |
| 2008/0098432 | A1 | 4/2008 | Hardacker et al. | |
| 2008/0098433 | A1 | 4/2008 | Hardacker et al. | |
| 2008/0127253 | A1* | 5/2008 | Zhang | H04N 21/478 725/35 |
| 2008/0146277 | A1 | 6/2008 | Anglin et al. | |
| 2008/0196075 | A1 | 8/2008 | Candelore | |
| 2008/0244637 | A1 | 10/2008 | Candelore | |
| 2008/0273114 | A1* | 11/2008 | Hardacker | H04H 60/48 348/468 |
| 2008/0279453 | A1* | 11/2008 | Candelore | G03B 21/26 382/176 |
| 2009/0077049 | A1 | 3/2009 | Seet et al. | |
| 2009/0083801 | A1 | 3/2009 | Hardacker et al. | |
| 2009/0205000 | A1* | 8/2009 | Christensen | H04N 21/8456 725/61 |
| 2009/0320070 | A1 | 12/2009 | Inoguchi | |
| 2009/0328237 | A1* | 12/2009 | Rodriguez | G06F 17/30781 726/32 |
| 2010/0008266 | A1* | 1/2010 | Reda | H04L 41/0213 370/277 |
| 2010/0037264 | A1 | 2/2010 | Hardacker et al. | |
| 2010/0123735 | A1* | 5/2010 | Blanchard | H04N 5/44591 345/620 |
| 2010/0165207 | A1* | 7/2010 | Deng | H04N 5/213 348/620 |
| 2010/0192178 | A1* | 7/2010 | Candelore | G06K 9/325 725/39 |
| 2010/0225830 | A1* | 9/2010 | Blanchard | H04N 5/50 348/732 |
| 2010/0296007 | A1* | 11/2010 | Cooper | H04H 60/43 348/731 |
| 2011/0025842 | A1* | 2/2011 | King | G06F 17/211 348/135 |
| 2011/0030016 | A1 | 2/2011 | Pino, Jr. et al. | |
| 2011/0081948 | A1 | 4/2011 | Shirai | |
| 2011/0247044 | A1 | 10/2011 | Jacoby | |
| 2011/0282906 | A1* | 11/2011 | Wong | G06F 17/30831 707/780 |
| 2011/0289532 | A1 | 11/2011 | Yu et al. | |
| 2011/0311095 | A1* | 12/2011 | Archer | G06K 9/00744 382/100 |
| 2012/0079534 | A1* | 3/2012 | Huang | G06K 9/3266 725/37 |
| 2012/0143595 | A1 | 6/2012 | Li et al. | |
| 2012/0210233 | A1 | 8/2012 | Davis et al. | |
| 2013/0041921 | A1 | 2/2013 | Cooper et al. | |
| 2013/0101002 | A1* | 4/2013 | Gettings | H04N 19/172 375/224 |
| 2013/0114849 | A1* | 5/2013 | Pengelly | G06F 17/289 382/103 |
| 2013/0120590 | A1* | 5/2013 | Clark | H04N 17/004 348/192 |
| 2013/0276029 | A1 | 10/2013 | Li et al. | |

OTHER PUBLICATIONS

Google Inc., International Preliminary Report on Patentability, PCT/US2013/060697, dated Mar. 24, 2015, 10 pgs.
Google Inc., International Search Report and Written Opinion, PCT/US2015/017999, dated Jul. 6, 2015, 10 pgs.
Communication under rule 61/162 EPC, App. No. 15710665.9, Oct. 6, 2016, 2 pgs.

* cited by examiner

AUTOMATED CHANNEL DETECTION WITH ONE-WAY CONTROL OF A CHANNEL SOURCE

RELATED APPLICATIONS

This application is a continuation-in-part of U.S. patent application Ser. No. 13/623,043, entitled "Using OCR to Detect Currently Playing Television Programs," filed on Sep. 19, 2012, which is incorporated by reference herein in its entirety.

This application is related to U.S. patent application Ser. No. 13/831,166, entitled "Identification and presentation of Internet-Accessible Content Associated with Currently Playing Television Programs," filed on Mar. 14, 2013, which is incorporated by reference herein in its entirety.

TECHNICAL FIELD

The disclosed implementations relate generally to systems, methods and devices configured to collect information about television listings.

BACKGROUND

Interactive television technologies generally enable adding Internet-based functionality, content and/or services as an overlay to the television signals provided by cable and satellite television providers. For example, one of the aims of interactive television technologies is to deliver Internet-accessible functionality, content and/or services to an individual consumer that are matched to a particular television program the consumer is currently watching. To that end, interactive television technologies often need to determine what a consumer is watching in order to deliver matched functionality, content and/or services.

According to previously developed systems and methods, a second device, such as a supplemental set-top box, is configured to work with the primary set-top box provided by a cable or satellite television provider. In order to determine what a consumer is watching, the supplemental set-top box sends a query to the primary set-top box requesting information about the currently playing television program selected by the consumer (e.g. the title, names of actors or characters, electronic program guide information, etc.). In order to send such a query or otherwise communicate with the primary set-top box, the supplemental set-top box usually includes one or more provider-specific application program interfaces (APIs) that enable the supplemental set-top box to be paired with a wide variety of primary set-top boxes from various cable and satellite television providers. The development of each API requires the input and cooperation of a respective cable or satellite television provider that provides a primary set-top box to consumers. Developing the APIs with various providers tends to be inefficient, and hinders scaling such technologies across a wide variety of provider-specific platforms.

SUMMARY

Various implementations of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the features of various implementations are used to enable identifying and presenting, in real time, Internet-accessible and/or Internet-based functionality, content and/or services associated with a particular television program concurrently playing on a television or display.

One aspect of the disclosure is a computer-implemented method of identifying a media program by capturing display data from the media program as it is being presented; evaluating the display data to determine whether or not the display data includes a text overlay including information about the media program; and extracting text from the overlay in response to determining that the display data includes the text overlay, wherein the extracted text is associated with the media program.

Another aspect of the disclosure is a computer program product enabling identification of a playing broadcast media program by a device including a processor and a memory. In some implementations, the computer program product includes instructions, storable in a non-transitory memory and executable by a processor, that, when executed by a processor, cause a device to capture display data provided by a set-top box; evaluate the display data to determine whether or not the display data includes a text overlay including information about the playing broadcast media program; and, extract text in response to determining that the display data includes said text overlay, wherein the extracted text identifies the playing broadcast media program.

Another aspect of the disclosure is a computer-implemented method of determining a channel line-up available through a primary TV receiver that is implemented at an electronic device configured to receive a media program, the electronic device including one or more processors and memory. In some implementations, the method includes: sending a control command to a primary TV receiver in order to tune the primary TV receiver to a first candidate channel; capturing display data provided by the primary TV receiver in response to the primary TV receiver receiving the control command; analyzing the display data to determine whether or not the first candidate channel is being used to deliver non-superfluous television content through the primary TV receiver; and selecting at least one additional candidate channel in response to determining whether or not the first candidate channel is being used to deliver non-superfluous television content through the primary TV receiver.

In some implementations, capturing the display data includes performing a screen capture from a display device configured to display channel data received from the primary TV receiver. In some implementations, capturing the display data includes reading a display pixel buffer from at least one of the primary TV receiver and a display device. In some implementations, capturing the display data includes decoding data transmitted by the primary TV receiver to the display device.

In some implementations, analyzing the display data includes: evaluating the display data to determine whether or not the display data includes a text overlay including information about the media program; and extracting text from the text overlay in response to determining that the display data includes the text overlay, wherein the extracted text is associated with the media program.

In some implementations, the method of determining a channel line-up available through a primary TV receiver further includes: comparing the extracted text to electronic program guide data to confirm identification of the playing broadcast media program.

In some implementations, analyzing the display data includes video analysis to determine whether or not the first candidate channel is being used to deliver non-superfluous television content through the primary TV receiver. In some implementations, analyzing the display data comprises fingerprinting the display data to determine whether or not the first candidate channel is being used to deliver non-superfluous television content through the primary TV receiver.

In some implementations, the method of determining a channel line-up available through a primary TV receiver further includes: transmitting a code to the set-top box to initiate the display of the text overlay; and transmitting a code to the set-top box to end the display of the text overlay is response to capturing the display data. In some implementations, the code is an infrared code.

In some implementations, the method of determining a channel line-up available through a primary TV receiver further includes: detecting a transmission directed at the set-top box.

Another aspect of the disclosure is a computer program product enabling determination of a channel line-up available through a primary TV receiver by a device including one or more processors and memory. In some implementations, the computer program product includes instructions, storable in a non-transitory memory and executable by a processor, that, when executed by a processor, cause a device to: send a control command to a primary TV receiver in order to tune the primary TV receiver to a first candidate channel; capture display data provided by the primary TV receiver in response to the primary TV receiver receiving the control command; analyze the display data to determine whether or not the first candidate channel is being used to deliver non-superfluous television content through the primary TV receiver; and select at least one additional candidate channel in response to determining whether or not the first candidate channel is being used to deliver non-superfluous television content through the primary TV receiver.

Another aspect of the disclosure is a system for determining a channel line-up available through a primary TV receiver. In some implementations, the system includes one or more processors and memory that stores instructions for execution by the one or more processors, wherein the memory includes instructions that, when executed by the processor, cause the system to: send a control command to a primary TV receiver via the command sending module in order to tune the primary TV receiver to a first candidate channel; capture display data provided by the primary TV receiver in response to the primary TV receiver receiving the control command; analyze the display data to determine whether or not the first candidate channel is being used to deliver non-superfluous television content through the primary TV receiver; and select at least one additional candidate channel in response to determining whether or not the first candidate channel is being used to deliver non-superfluous television content through the primary TV receiver.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1A:
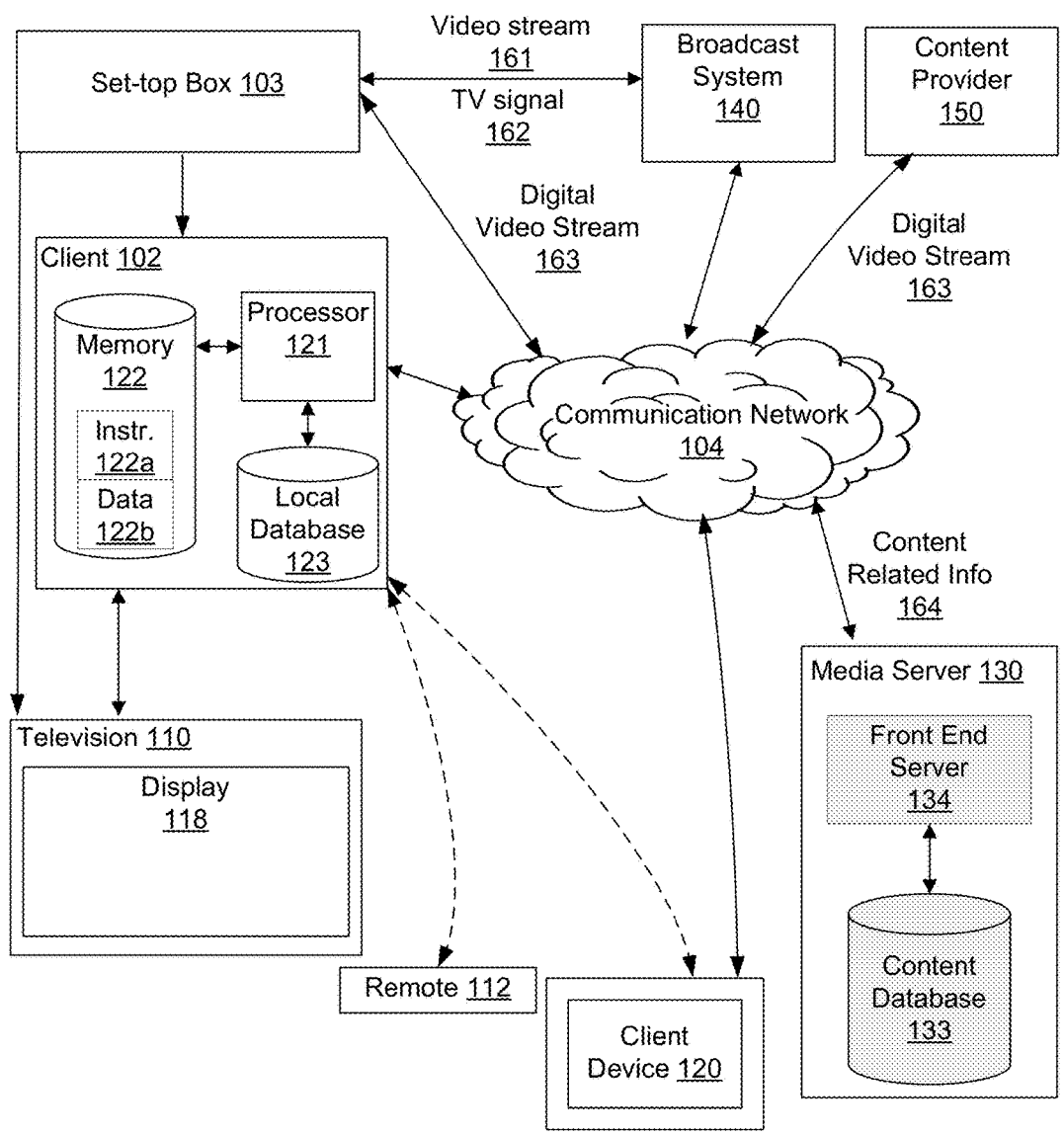
FIG. 1A is a diagram of an implementation of a client-server environment.

In accordance with common practice the various features illustrated in the drawings may not be drawn to scale. Accordingly, the dimensions of the various features may be arbitrarily expanded or reduced for clarity. In addition, the drawings may not depict all of the components of a given system, method or device; because, known methods, components, and circuits have not been described in exhaustive detail. Finally, like reference numerals may be used to denote like features throughout the specification and figures.

DETAILED DESCRIPTION

The various implementations described herein include systems, methods and/or devices that are enabled to determine what a particular consumer is watching on television in order to deliver matched functionality, content and/or services, as a part of an interactive television suite of technologies. In particular, in some implementations, the process of determining what a particular consumer is watching is enabled so that communication between the primary set-top box and a supplemental set-top box and/or television-integrated device is reduced, thereby avoiding the need for one or more provider specific APIs. For example, one aspect of the disclosure is a method of identifying a media program by capturing display data from the media program, and extracting text from the display data in response to determining that the display data includes the text overlay, wherein the extracted text is associated with the media program. Additionally and/or alternatively, in some implementations, a supplemental set-top box (or television integrated device) is configured to operate a primary set-top box, without a provider-specific API, in order to determine the channel line-up available to a particular subscriber through the primary set-top box. In addition, in some implementations, similar methods and features can be used to identify channel lineups available to viewers of non-subscription media content, such as over the air broadcasts that are received by a TV receiver, such as a TV receiver included, without limitation, in a computer, a media player, such as a DVD or Blu-ray player, or a digital video recorder (DVR). A common factor in each of these situations is that the supplemental set-top box does not have direct knowledge of the TV channels that are available to the primary set-top box or other TV receiver. Consequently, the supplemental set top box needs to implement indirect strategies to identify a TV channel that is being tuned by, or entire channel lineup available to, the primary set-top box or other TV receiver.

Numerous details are described herein in order to provide a thorough understanding of the example implementations illustrated in the accompanying drawings. However, the invention may be practiced without these specific details. And, well-known methods, procedures, components, and circuits have not been described in exhaustive detail so as not to unnecessarily obscure more pertinent aspects of the example implementations.

FIG. 1A is a diagram of an implementation of a client-server environment 100. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes a set-top box 103, a television (TV) 110, a client device 102 (e.g., a supplemental set-top box), a second screen client device 120 (e.g. a laptop, a tablet computer, smartphone, etc.), a remote control device 112, a communication network 104, a media server 130, a broadcast system 140, and a content provider 150. The second screen client device 120, the client device 102, the media server 130, the broadcast system 140, and the content provider 150 are capable of being connected to the communication network 104 in order to exchange information with one another and/or other devices and systems. The client-server environment 100 is merely an example provided to discuss more pertinent features of the present disclosure. Those skilled in the art will appreciate from the present disclosure that any number of such devices and/or systems may be provided in a client-server environment, and particular devices may be altogether absent.

In some implementations, the media server 130 is implemented as a single server system, while in other implementations it is implemented as a distributed system of multiple servers. Solely for convenience of explanation, the media server 130 is described below as being implemented on a single server system. Similarly, in some implementations, the broadcast system 140 is implemented as a single server system, while in other implementations it is implemented as a distributed system of multiple servers. Solely, for convenience of explanation, the broadcast system 140 is described below as being implemented on a single server system. Similarly, in some implementations, the content provider 150 is implemented as a single server system, while in other implementations it is implemented as a distributed system of multiple servers. Solely, for convenience of explanation, the content provider 150 is described below as being implemented on a single server system. Moreover, the functionality of the broadcast system 140 and the content provider 150 can be combined into a single server system. Additionally and/or alternatively, while only one broadcast system and only one content provider is illustrated in FIG. 1A for the sake of brevity, those skilled in the art will appreciate from the present disclosure that fewer or more of each may be present in an implementation of a client-server environment.

In some implementations, the second screen client device 120 (e.g. a tablet computer or laptop, etc.), the set-top box 103, the TV 110, the client device 102, and a remote control 112 are provided in combination within, for example, a home or commercial establishment. The set-top box 103 is configured to receive and decode signals including media content from the broadcast system 140 or the like. In operation, the set-top box 103 decodes the signal received from the broadcast system 140 or the like and provides audio and video content to the TV 110 for display. While a TV has been used in the illustrated example, those skilled in the art will appreciate from the present disclosure that any number of displays devices, including computers, laptop computers, tablet computers, smart-phones and the like, can be used to display a video stream and play the associated audio stream. Additionally and/or alternatively, in some implementations the functions of the set-top box 103 and the TV 110 are combined into a single device.

In operation, the remote control 112 may be used to control the operation of one or more of the set-top box 103, the TV 110, and the client device 102. In one mode of operation, the client device 102 monitors the display 118 of the TV 110 to determine when a program information overlay is provided. In another mode of operation, the client device 102 emulates the function of the remote control device 112 (e.g., by sending IR commands via an IR blaster 125 (FIG. 1B)) to prompt the set-top box 103 to display the program information overlay. And in yet another mode of operation, the client device 102 receives IR transmissions from the remote control 112 that are directed to the set-top box 103. In turn, the client device 103 may then communicate with any one of the media monitoring server 130, the broadcast system 140, and the content provider 150 through the communication network 104. More specific details pertaining to how the client device 102 acquires real time program information related to what a particular user is watching is described below with reference to FIGS. 3-5.

In some implementations, the set-top box 103 is any computer device capable of connecting to the communication network 104, receiving video streams, extracting information from video streams and presenting video streams for the display using the TV 110 (or another display device). In some implementations, the set-top box 103 is configured as a receiver for cable TV and/or satellite TV, a digital video recorder (DVR), a digital media receiver, a TV tuner, a computer, and/or any other device that outputs TV signals. In some implementations, the TV 110 is a conventional TV display that is not connectable to the Internet and that displays digital and/or analog TV content received via over the air broadcasts or a satellite or cable connection.

Similarly, in some implementations the client device 102 is any computer device capable of connecting to the communication network 104 and the TV 110. As described below with reference to FIG. 5, in some implementations, the client device 102 is capable of receiving infrared (IR) transmissions directed to the set-top box 103 from the remote control device 112. Additionally and/or alternatively, in some implementations, the client device 102 is capable of wired and/or wireless communication with the client device 120. In some implementations, the client device 102 includes one or more processors 121, non-volatile memory 122 such as a hard disk drive, and a local database 123. In some implementations, the memory 122 includes application instructions 122a and associated data 122b. In some implementations, the local database 123 and/or the associated data 122b stores information related to local channel lineups, including one or more local channel lineups 180-i discovered through operations described herein. In some implementations, the operations are performed by the application instructions 122a.

Figure 2A:
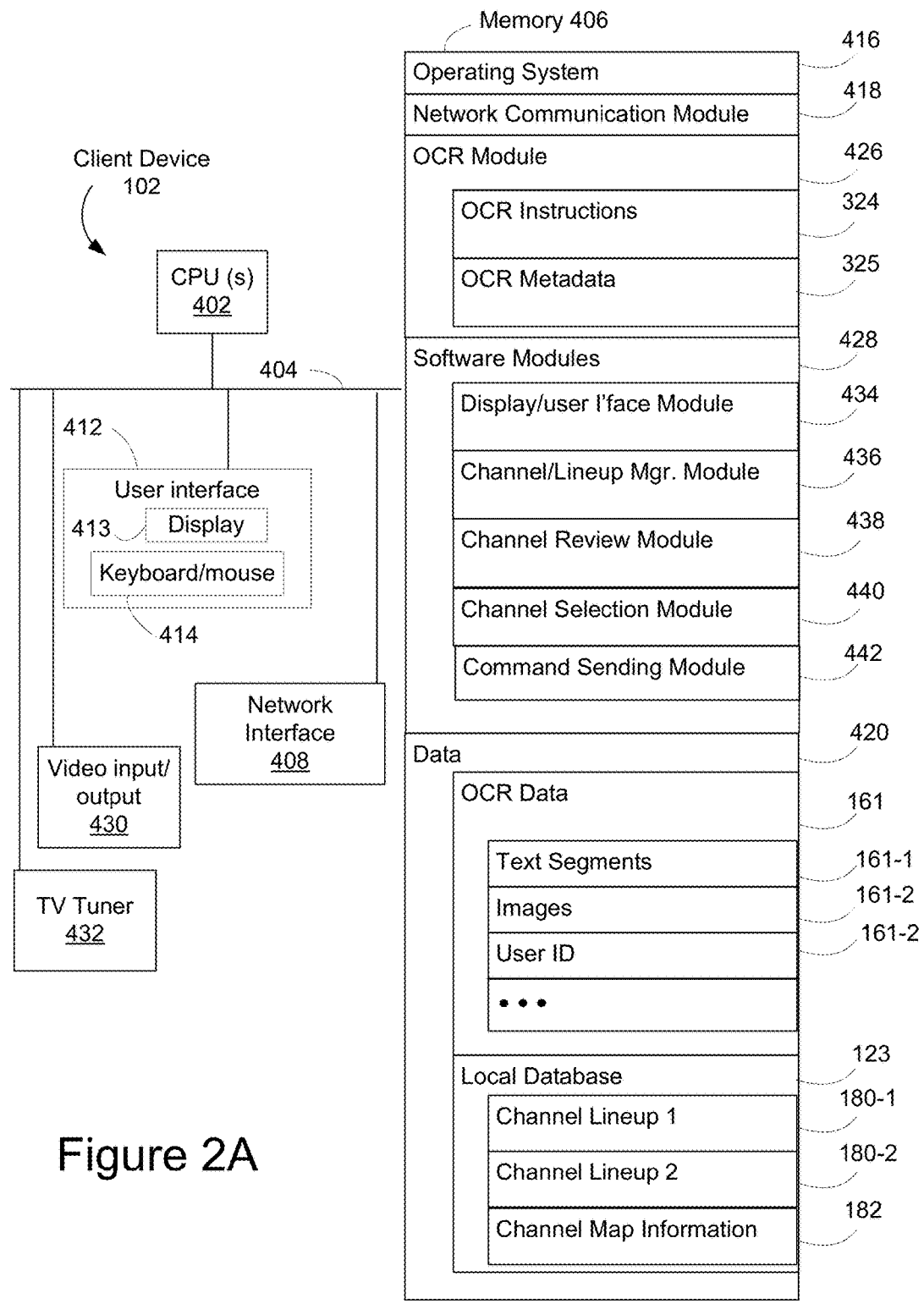
FIG. 2A is a diagram of an example implementation of a client device operable as a supplemental set-top box and/or a television-integrated device.
Figure 2B:
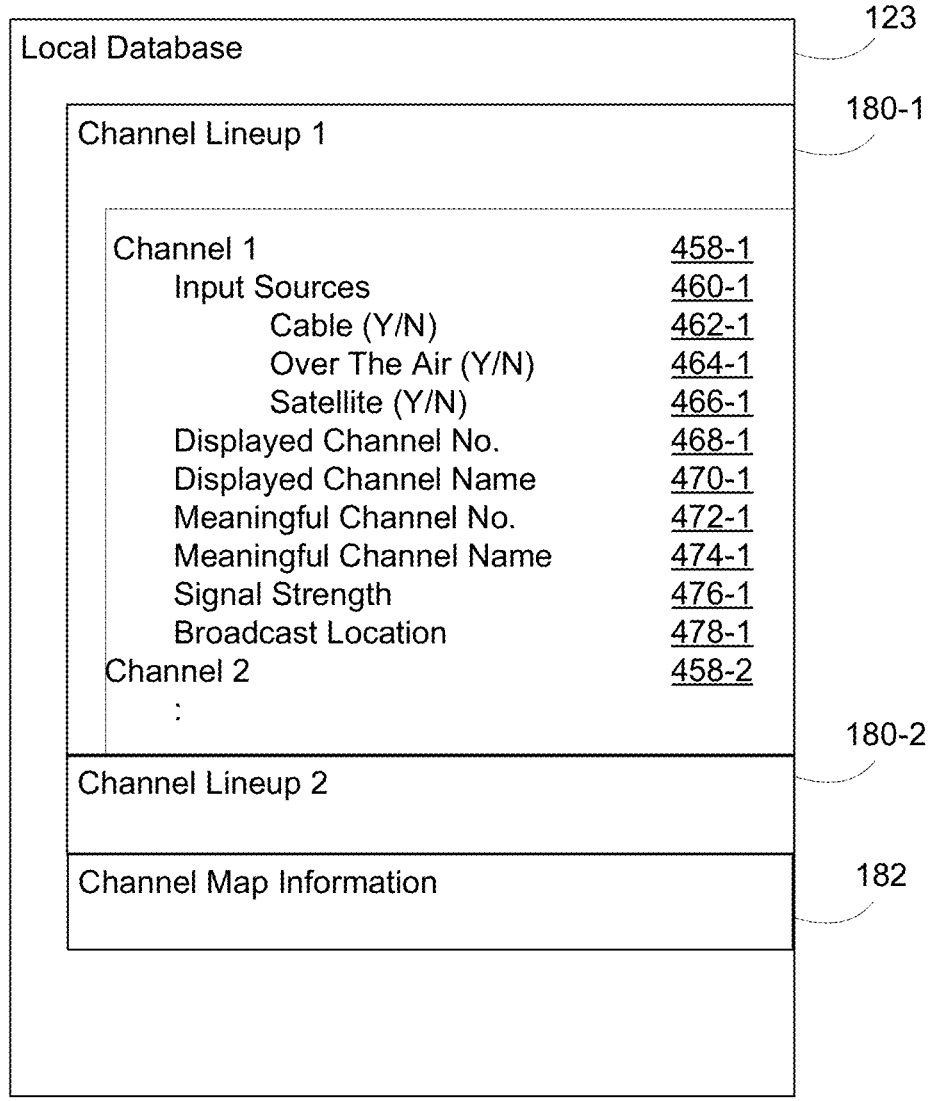
FIG. 2B is a diagram showing additional details of the Local Database.

FIG. 2B shows information associated in some implementations with individual channels 458 saved in a channel lineup 180-1 stored in the local database 123. This information, or subsets or supersets thereof, can be associated with any number of one or more of the channel lineups 180.

In the illustrated implementation(s), a representative first channel lineup 180-1 includes, for an individual channel 458-1 in the lineup, one or more of: input source information 460-1, displayed channel number 468-1, displayed channel name 470-1, meaningful channel number 472-1, meaningful channel name 4741-1, signal strength 476-1 and broadcast location. In some implementations, the input sources 460-1 indicate the source of a respective particular channel using Yes/No or similar binary values. In some implementations the input sources 460-1 indicate whether the tuned channel is from a cable provider 462-1, an over the air source 464-1 (such as a terrestrial broadcast TV channel) or from a satellite source 468-1. Alternatively, the input sources 460-1 can be represented with a single field that holds a value that indicates the source for the respective channel (e.g. "OTA," "Cable," or "Satellite-Dish"). The displayed channel number 468-1 and name 470-1 are the channel number and name displayed on the TV display 110 (FIG. 1B) and captured via OCR operations. The displayed channel number 468-1 and name 470—might not be meaningful to a user (e.g., the channel number 468-1 could be a three digit value assigned by a cable company with no relationship to a known channel number). As a result, the channel information includes in some implementations, for each tuned channel, a meaningful channel number 472-1 (e.g., a recognizable over the air channel number) and channel name 474 (e.g., a recognizable network or channel name). The channel information for a representative channel; 458-1 also includes in some implementations information related to channel reception and transmission, including signal strength 476-1 and broadcast location 478-1.

As discussed in greater detail below, the processor 121 executes the one or more applications in accordance with a set of instructions received from the media monitoring server 130. The client device 102 may also have input devices such as a keyboard, a mouse and/or track-pad (not shown). In some implementations, the client device 102 includes a touch screen display, a digital camera and/or any number of supplemental devices to add functionality.

As is typical of televisions, the TV 110 includes a display 118 and speakers. Additionally and/or alternatively, the TV 110 can be replaced with another type of display device for presenting video content to a user, such as for example, a computer, a tablet device, a mobile telephone, a projector, or other type of video display system. The display device can be coupled to the set-top box 103 via a wireless or wired connection.

As used herein, a TV signal is an electrical, optical, or other type of data transmitting medium that includes audio and/or video components corresponding to a TV channel. In some implementations, the TV signal is a terrestrial over-the-air TV broadcast signal or a sign distributed/broadcast on a cable-system or a satellite system. In some implementations, the TV signal is transmitted as data over a network connection. For example, the set-top box 103 can receive video streams from an Internet connection. Audio and video components of a TV signal are sometimes referred to herein as audio signals and video signals. In some implementations, a TV signal corresponds to a TV channel that is being displayed on the TV 110.

Figure 1B:
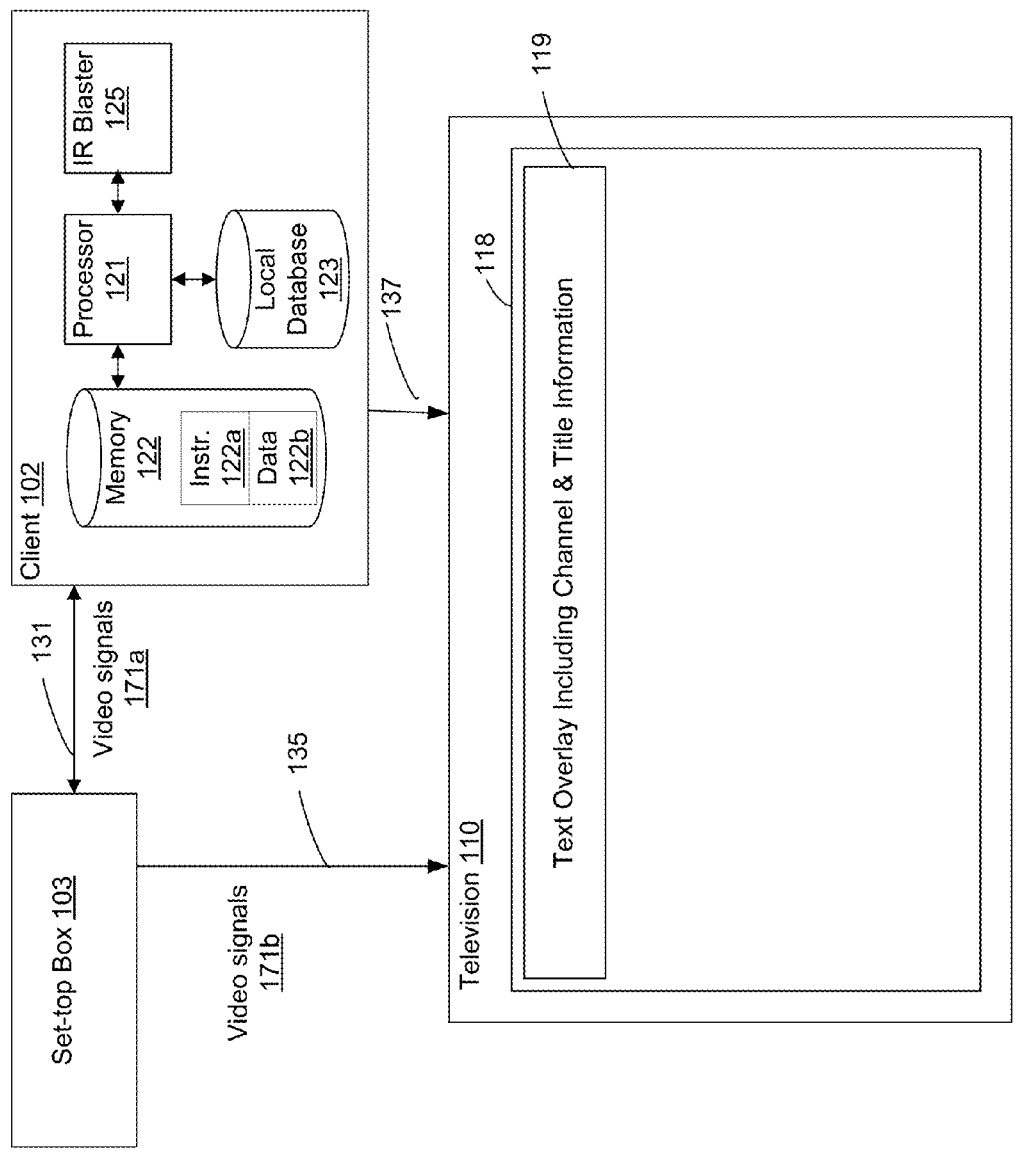
FIG. 1B is a diagram of a portion of the client-server environment including an example schematic screen display on a television.

FIG. 1B is a diagram of a portion of the client-server environment 100 including an example schematic screen display on the TV 110. Again, the TV 110 includes the display 118 on which video of a media program is displayed. Further, while the video is being displayed, the set-top box 103 may provide a text overlay 119 that includes channel and title information. For example, the text overlay 119 typically includes the channel the media program is being presented on, as well as the title of the media program. The text overlay 119 also often includes information about actors, characters, and/or a synopsis of the media program. In some implementations, as shown in FIG. 1B, the client 102 is connected to the set-box 103 via a connection 131 by which the client 102 can receive video signals 171a from the set top box 103 the same as or comparable to the video signals 171b provided by the set top box 103 to the television 110 via the connection 135. This allows the client 102 to analyze and perform optical character recognition (OCR) on the text overlay 119 provided by the set top box 103 along with the video and/or audio content and/or metadata associated with the show being watched (all provided as part of the video signals 171). In some implementations, the communications 131, 135 between the set top box 103 and the TV 110 and/or the client 102 are substantially or entirely one way. That is, while it is possible for the set top box 103 to provide signals to the TV 110 and the client 102, it is not possible for the TV 110 and the client 102 to control the set top box 103 via commands sent back to the set top box 103 via the connections 131 and 135.

With further reference to FIG. 1A, the second screen client device 120 may be any computer device that is capable of connecting to the communication network 104, such as a computer, a laptop computer, a tablet device, a netbook, an Internet kiosk, a personal digital assistant, a mobile phone, a gaming device, or any other device that is capable of communicating with the media server 130.

The communication network 104 may be any combination of wired and wireless local area network (LAN) and/or wide area network (WAN), such as an intranet, an extranet, including a portion of the Internet, or a wireless network provided by a wireless carrier. It is sufficient that the communication network 104 provides communication capability between the second screen client device 120 and the media monitoring server 130. In some implementations, the communication network 104 uses the HyperText Transport Protocol (HTTP) to transport information using the Transmission Control Protocol/Internet Protocol (TCP/IP). HTTP permits the client device 102 to access various resources available via the communication network 104. However, the various implementations described herein are not limited to the use of any particular protocol.

In some implementations, the media monitoring server 130 includes a front end server 134 that facilitates communication between the media monitoring server 130 and the communication network 104. The front end server 134 receives content information from the client device 102. As described in greater detail below, in some implementations, the content information includes program information, such as the program title, actor names, character names, plot summaries, etc. In some implementations, the front end server 134 is configured to send a set of instructions to the client device 102. In some implementations, the front end server 134 is configured to send content files, links to content files and/or metadata associated with the content files. The term "content file" includes any document or content of any format including, but not limited to, a video file, an image file, a music file, a web page, an email message, an SMS message, a content feed, an advertisement, a coupon, a playlist or an XML document. In some implementations, the front end server 134 is configured to send or receive one or more video streams. In some implementations, the front end server 134 is configured to receive content directly from the broadcast system 140 and/or the content provider 150 over the communication network 104.

In some implementations, the media monitoring server 130 includes a content database 133. In some implementations, the content database 136 includes advertisements, videos, images, music, web pages, email messages, SMS messages, content feeds, advertisements, coupons, playlists, XML documents, and ratings associated with various media content or any combination thereof. In some implementations, the content database 136 includes links to advertisements, videos, images, music, web pages, email messages, SMS messages, content feeds, advertisements, coupons, playlists, XML documents and ratings associated with various media content. In some implementations, the content database 133 is a distributed database.

In some implementations, the broadcast system 140 includes media content such as TV programs. In some implementations, the broadcast system 140 also includes metadata associated with one or more of the TV programs, and application program interface instructions. In some implementations, the application program interface instructions include instructions that can be provided to a client device and/or may be executed by the broadcast system 140 under a client-server model or the like in order to link a particular TV program with the associated metadata and/or link the TV program and the associated metadata 142 with external data and/or services, such as a social networking application. Similarly, in some implementations, the content provider 150 additionally and/or alternatively includes media content such as TV programs, as well as metadata associated with one or more of the TV programs.

FIG. 2A is a diagram of an example implementation of the client device 102, discussed above with reference to FIG. 1A, and which may be operable as a supplemental set-top box and/or a television-integrated device. While certain specific features are illustrated, those skilled in the art will appreciate from the present disclosure that various other features have not been illustrated for the sake of brevity and so as not to obscure more pertinent aspects of the implementations disclosed herein. To that end, the client device 102 includes one or more processing units (CPU's) 402, one or more network or other communications interfaces 408, memory 406, a TV tuner 432, a video I/O 430, and one or more communication buses 404, for interconnecting these and various other components. The communication buses 404 optionally include circuitry (sometimes called a chipset) that interconnects and controls communications between system components. The client device 102 may also include a user interface 412 comprising a display device 413 and a keyboard and/or mouse (or other pointing device) 414 and/or a remote control (etc.). Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternatively the non-volatile memory device(s) within memory 406, comprises a non-transitory computer readable storage medium. In some implementations, memory 406 or the computer readable storage medium of memory 406 store the following programs, modules and data structures, or a subset thereof, including an operating system 416, a network communication module 418, an OCR module 426, software modules 428, and data 420.

The operating system 416 includes procedures for handling various basic system services and for performing hardware dependent tasks.

The network communication module 418 facilitates communication with other devices via the one or more communication network interfaces 404 (wired or wireless) and one or more communication networks, such as the Internet, other wide area networks, local area networks, metropolitan area networks, and so on.

In some implementations, the OCR module 426 enables the client device 102 to process screen shots (e.g. images from the TV 110) to obtain the program information included in the program information overlay provided by the primary set-top box 103. To that end, the OCR module 426 includes OCR instructions 324 and metadata 325. In some implementations, the OCR instructions 324 include instructions that perform OCR operations to recognize program information from TV images and content and the metadata 325 includes data employed by the OCR module to support OCR operations. For example, in some implementations the metadata includes information related to common combinations of words associated with TV channels and programs, such as channel names, broadcaster names, and words commonly used in program titles.

In some implementations, the software modules include a display/user module 434, a channel lineup manager module 436, a channel review module 438, and a channel selection module 440. In some implementations, the display/user module 434 displays information provided by other software modules. The displayed information can include a channel lineup 180 discovered by some combination of the OCR module 426, channel lineup manager module 436, channel review module 438, and channel selection module 440. In some implementations, the channel lineup manager module 436 maps the discovered channel numbers to actual over the air channels as applicable and to cable channel names. The channel review module 438 enables a user to review, correct and remove channel information. In some implementations, the channel selection module 440 detects tuned signal strength and identifies whether a tuned channel is presenting non-superfluous content—i.e., anything that is not noise. In some implementations, the channel selection module 440 also allows a user to tune channels on the TV using simple channel up/down commands, or by entering an actual channel no., and causes appropriate channel information to be displayed on the TV. In some implementations, the channel selection module 440 employs an IR blaster 125 (FIG. 1B) to send appropriate channel tuning/selection and "info" commands to the STB (or alternatively, the TV 110). In some implementations, the channel selection module 440 and other modules or operations described herein that interact with the IR blaster 125 to send commands to the TV 110 or the STB 125 do so via a command sending module 442. Thus, using the recognized channel lineup information, a user is able to control the TV 110 via the client device 102 (which only possesses a one-way connection to TV and the STB) as if the client device 102 possessed a two-way connection to the TV, similar to that of the STB 103.

In some implementations, since channel information is not provided to the client device 102 via the connection with the set top box 103, presenting channel information requires the client 102 or an interconnected sever to perform finger-printing (e.g., of audio or video content snippets from media content played on the television 110) to confirm that the correct channel has been selected. This also means that the client device 102 needs to be able to issue an appropriate number of channel "Up" or "Down" commands (e.g., IR commands sent using the IR blaster 12 (FIG. 1B)) to the cable/set top box 103 (FIG. 1B) to navigate to the desired channel and then confirm that the correct channel has been arrived at. In some implementations, this is done by: (1) sending an "Info" IR command (similar to a user hitting the "Info" button on the TV remote control) and doing a quick OCR check of the resulting displayed on screen information—or (2) by fingerprinting the channel content confirm that it matches what the requested channel selection should be showing.

In some implementations, the display/user module 434 displays information provided by other software modules. The displayed information can include a channel lineup 180 discovered by some combination of the OCR module 426, channel lineup manager module 436, channel review module 438 and a channel selection module 440. In some implementations, the data module 420 includes OCR data 161 and a local database 123 of program information. In some implementations, the program information is received from a broadcast system and/or content provider. In some implementations, the OCR data 161 includes text segments 161-1, images 161-2 and user ID information 161-3.

Each of the above identified elements may be stored in one or more of the previously mentioned memory devices, and each of the modules or programs corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 406 stores a subset of the modules and data structures identified above. Furthermore, memory 406 may store additional modules and data structures not described above.

Figure 3:
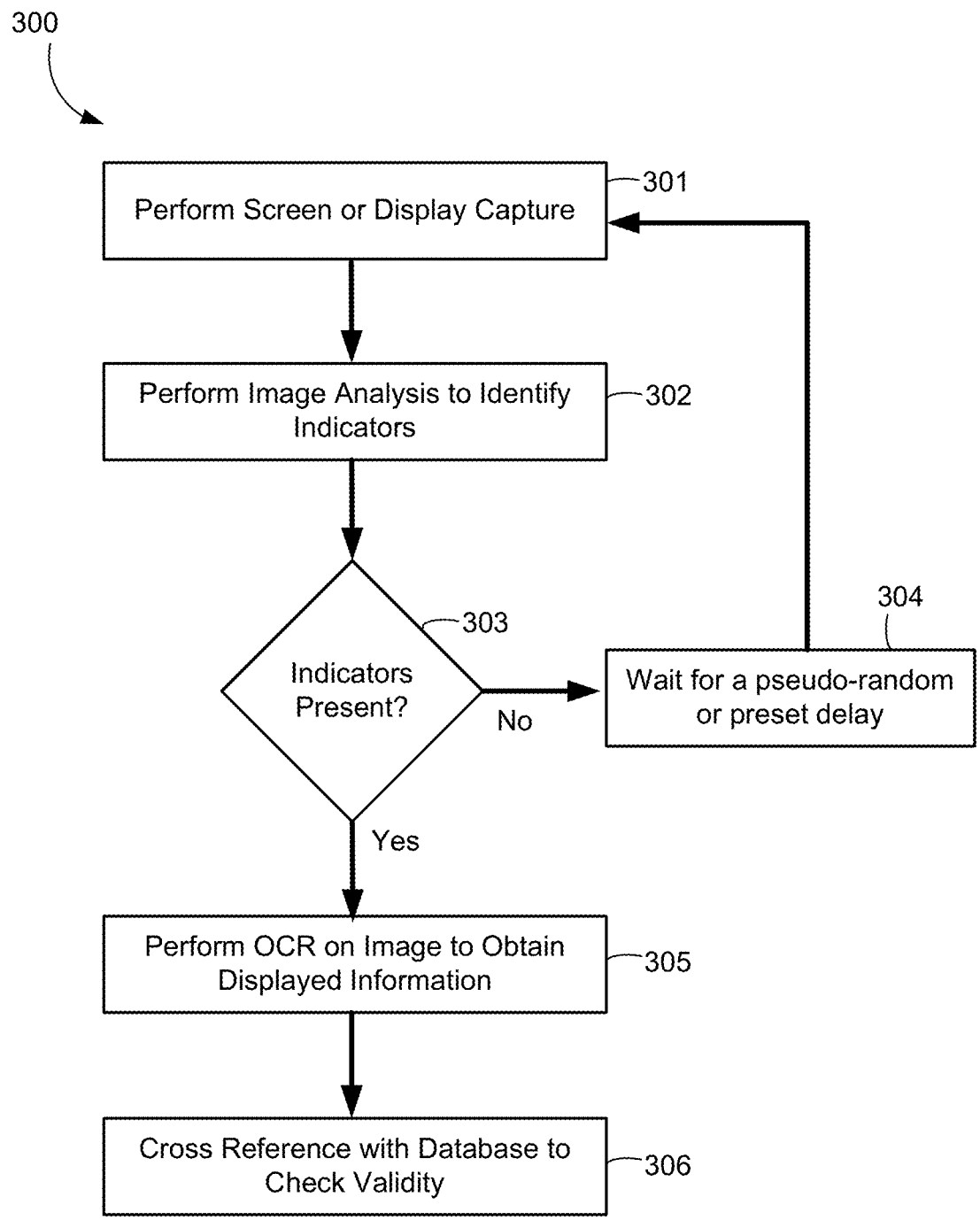
FIG. 3 is a flowchart representation of an implementation of a method of determining what a consumer is currently watching.

FIG. 3 is a flowchart representation of an implementation of a method 300 of determining what a consumer is currently watching. In some implementations, the method is performed by a device, such as a supplemental set-top box and/or a television integrated module, in order to enable determining what a consumer is currently watching. For example, with reference to FIG. 1A, in some implementations, the method 300 is performed by the client device 102 (i.e., the supplemental set-top box). As noted above, when a user changes the channel or requests program information by, for example, using one or more channel selection options or pressing an "INFO" button, the primary set-top box displays an overlay including program information, such as the current channel, the title of the playing program and information about the program. Accordingly, the method includes identifying instances during which the primary set-top box provides the overlay by monitoring the display output provided by the primary set-top box, and parsing the overlay for the desired information. Additionally and/or alternatively, in some implementations, the method includes detecting when channel identifiers are displayed without being prompted by user interaction (i.e., a user pressing a button)

To that end, the method includes performing a screen or display data capture from the display device that is displaying the television program selected by the consumer through a primary set-top box or the like in order acquire an image of what is being displayed (301). In some implementations, the screen capture data is obtained from the video signal provided by the primary set-top box. Additionally and/or alternatively, in some implementations, the screen capture data is obtained from a display (i.e., video) card included in the set-top box and/or the operating system of the set-top box. Additionally and/or alternatively, the screen capture data is obtained from a TV app running on at least one of the primary set-top box, the supplemental set-top box, the TV, and a second screen device. Additionally and/or alternatively, in some implementations, the supplemental set-top box (or the like) includes a camera operable to capture an image of the display of a television or the like. The method includes analyzing the image to identify whether the image includes indicators that an overlay is being displayed by the primary set-top box (302). For example, in some implementations, the indicators include the color of the overlay, the percentage of display area the overlay typically covers when visible, the arrangement of text with the overlay, contrast between a portion of the display likely to be displaying the program and another portion of the display likely to be displaying the overlay.

The method includes determining whether one or more of the indicators are present as indicated by the image analysis (303). If none of the indicators are present for a particular screen capture ("No" path from 303), the method includes waiting a pseudo-random amount of time or a preset delay time (304) before capturing another screen shot or the like. On the other hand, if at least one indicator is present or another threshold number of the indicators is present ("Yes" path from 303), the method includes applying an optical character recognition technique to the image in order to identify and extract the displayed information (305). Having extracted the title and/or program information, the method includes cross-referencing the extracted information with a local and/or remote database to ensure the validity of the information (306). For example, with further reference to FIG. 1A, the client device 102 may communicate with the media server 130 in order to check the validity of the extracted display information. More specifically, the client device 102 may transmit all or a portion of the extracted information to the media server 130. In turn, the media server 130 may then check the extracted information against a content database (e.g., the content database 133, FIG. 1) to ensure that the extracted data is correct and/or provide corrected information to the client device 102 when the extracted data is incorrect but can be matched to database information.

Figure 4:
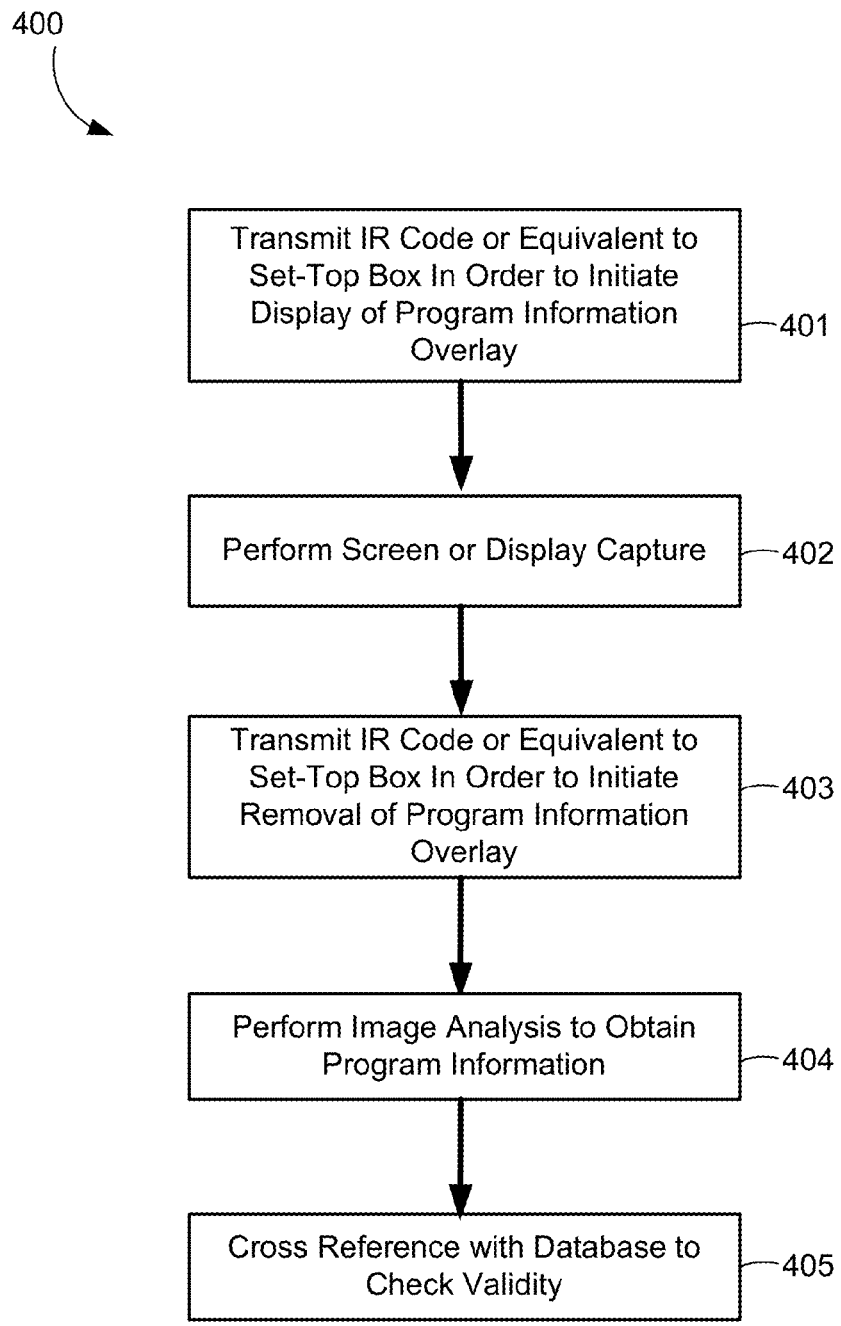
FIG. 4 is a flowchart representation of an implementation of a method of determining what a consumer is currently watching.

FIG. 4 is a flowchart representation of an implementation of a method 400 of determining what a consumer is currently watching. In some implementations, the method is performed by a device, such as a supplemental set-top box and/or a television integrated module, in order to enable determining what a consumer is currently watching by, in part, emulating the operation of a remote control device associated with the primary set-top box. To that end, the method includes transmitting a first infrared (IR) code (or the like) to the primary set-top box in order to initiate the display of the program information overlay (401). For example, with further reference to FIG. 1A, one of the client device 102 and the client device 120 may transmit an IR code to the set-top box 103.

The method then includes performing a screen capture to acquire a screen shot (i.e. image) including the program information overlay (402). Having acquired the screen shot, the method includes transmitting a second IR code (or the like) to the primary set-top box in order to initiate the removal of the program information overlay on the playing television program (403). The method includes analyzing the image or screen shot to obtain the program information presented in the overlay (404). Having extracted the title and/or program information, the method includes cross-referencing the extracted information with a local and/or remote database 133 to ensure the validity of the information (406).

Figure 5:
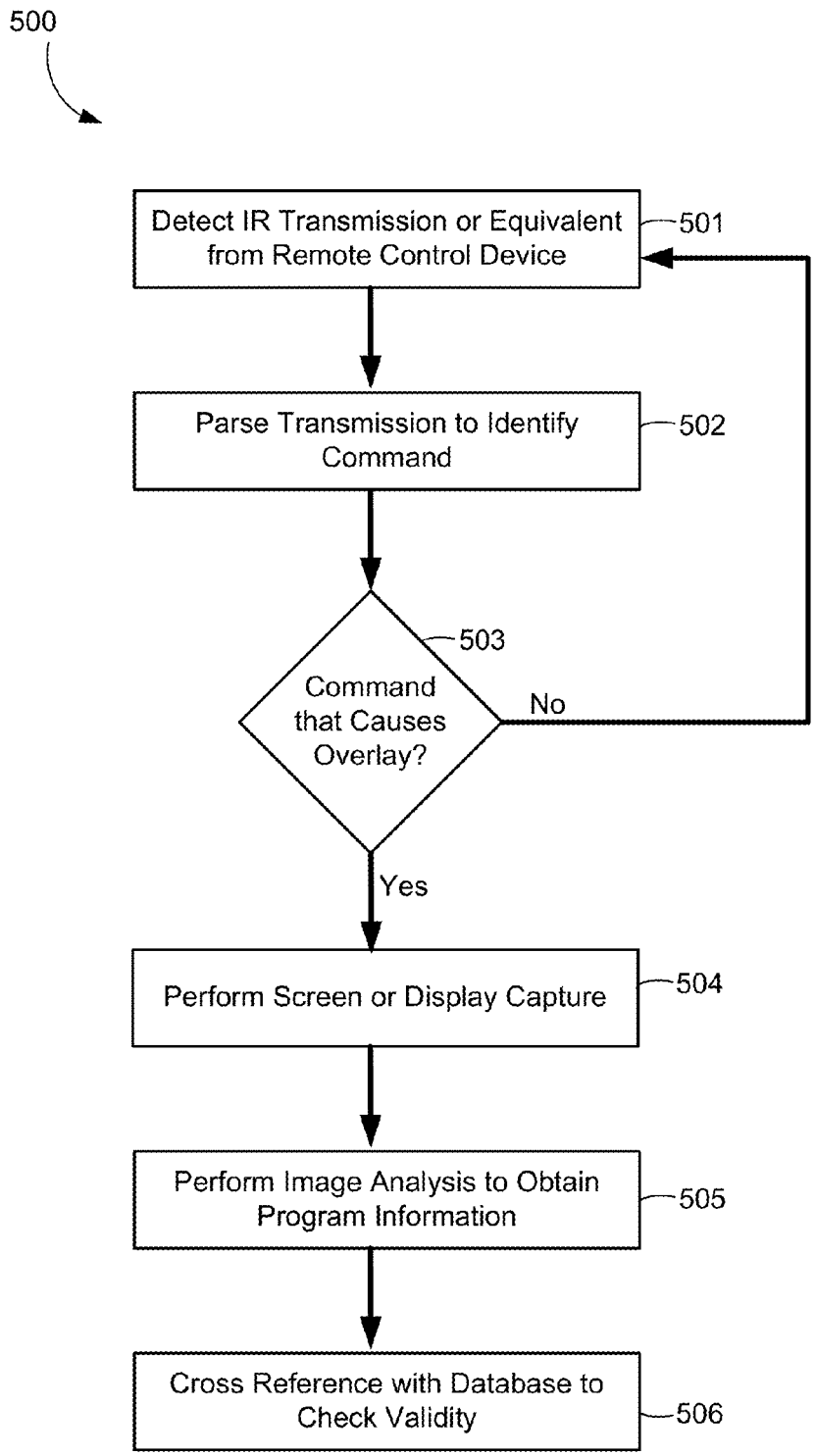
FIG. 5 is a flowchart representation of an implementation of a method of determining what a consumer is currently watching.

FIG. 5 is a flowchart representation of an implementation of a method 500 of determining what a consumer is currently watching. In some implementations, the method is performed by a device, such as a supplemental set-top box and/or a television integrated module, in order to enable determining what a consumer is currently watching, by detecting IR transmission from a remote control device associated with the primary set-top box. For example, with further reference to FIG. 1A, the client device 102 may detect IR transmissions directed to the primary set-top box 103 from the remote control device 120.

To that end, the method includes detecting an IR transmission or equivalent from a remote control device associated with a primary set-top box (501). In turn, the method includes parsing the transmission in order to identify the command that is represented by the IR transmission (502). Having identified the command, the method includes determining whether or not the identified command causes the primary set-top box to provide the program information overlay in the video stream provided to the display device. If the detected command is not likely to cause the primary set-top box to provide the program information overlay ("No" path from 503), the method includes circling back to detect another IR transmission. On the other hand, if the detected command is likely to cause the primary set-top box to provide the program information overlay ("Yes" path from 503), the method includes performing a screen or display data capture from the display device that is displaying the television program selected by the consumer through a primary set-top box or the like in order acquire an image of what is being displayed (504). The method includes analyzing the image or screen shot to obtain the program information presented in the overlay (505). And, the method includes cross-referencing the extracted information with a local and/or remote database to ensure the validity of the information (506).

Figure 6:
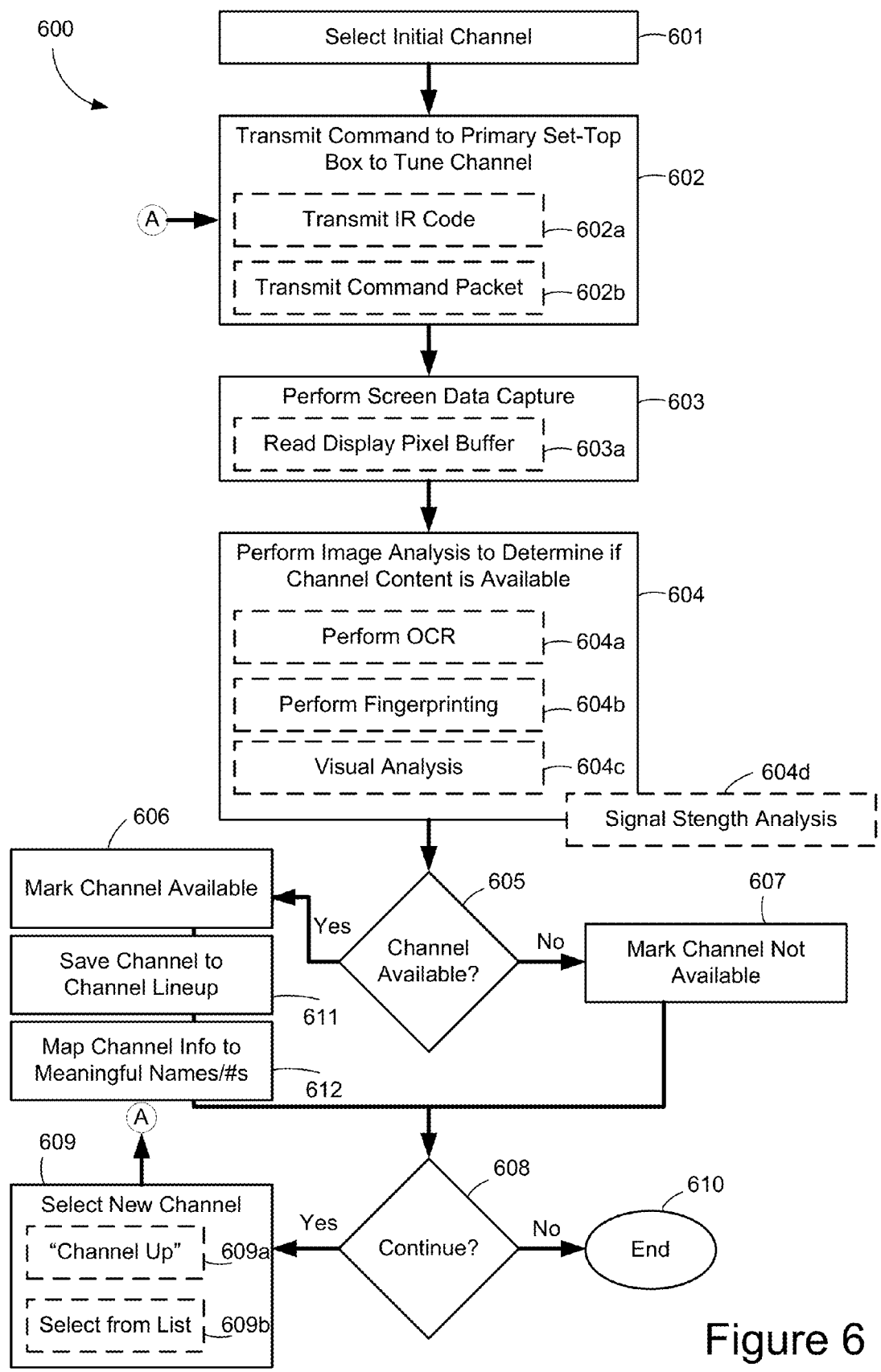
FIG. 6 is a flowchart representation of an implementation of a method of determining channel line-up access available through a primary set-top box.

FIG. 6 is a flowchart representation of an implementation of a method 500 of determining channel line-up access available through a primary set-top box. In some implementations, the method is performed by a device, such as a supplemental set-top box and/or a television integrated module, in order to enable determining channel line-up access available through a primary set-top box by using the primary set-top box channel control commands. For example, with further reference to FIG. 1A, the client device 102 may transmit IR transmissions to the primary set-top box 103 or provide equivalent signaling.

To that end, the method 600 includes selecting an initial candidate channel to probe using the primary set-top box channel control commands (601). In some implementations, a candidate channel is any one of the suspected channel numbers that may be available through the primary set-top box. Having selected a candidate channel, the method 600 includes transmitting a control command to the primary set-top box to tune the primary set-top box to the candidate channel (602). For example, in some implementations, transmitting a control command includes transmitting an IR code (602a). In some implementations, transmitting a control command includes transmitting a command packet over a data connection (602b).

Subsequent to transmitting the control command, the method 600 includes performing a screen data capture (603). In some implementations, performing a screen data capture includes reading a display pixel buffer and/or reading from a display pixel bus in order to obtain at least a single frame of screen display information (603a). The method 600 then includes performing an image analysis to determine if the candidate channel is available as a part of a subscription associated with the primary set-top box, and thus delivering non-superfluous television content (604). In some implementations, non-superfluous television content includes television programs, sporting events, news broadcasts, movies, etc. In some implementations, superfluous television content includes data such as pay-per-view title screens, subscription information (e.g. a contact number or website address), looping advertisements and/or content trailers indicating the type of content that would be available to a subscriber of the channel that is currently not available because the primary set-top box is not associated with such a subscriber. In some implementations, performing image analysis includes performing and/or applying OCR to identify text content in the screen display data (604a). In some implementations, performing image analysis includes fingerprinting the at least one frame of screen display data to identify the program content (604b). In some implementations, performing image analysis includes performing a video analysis to determine whether or not the candidate channel is being used to deliver non-superfluous television content (604c). In some implementations, in addition to, or as a substitute for visual analysis 604c, the channel selection model 440 (FIG. 2A) or equivalent functionality determines (604d) whether a particular channel is carrying non-superfluous television content by analyzing signal strength of channels.

Based on the image analysis, the method 600 includes deciding whether the candidate channel is being used to deliver non-superfluous television content (605). If the candidate channel is being used to deliver non-superfluous television content ("Yes" path from 605), the method 600 includes marking the candidate channel as available or a member of the subscription line-up available through the primary set-top box (606). If the candidate channel is not being used to deliver non-superfluous television content ("No" path from 605), the method 600 includes marking the candidate channel as unavailable or not a member of the subscription line-up available through the primary set-top box (607). Information for active channels is then saved in one of the channel lineups 180 (611). Information saved for the active channels includes information recognized from the displayed channel information (such as channel number and name) and information obtained from local or external sources, such as a program guide stored on the client device 102 or a server that is coupled to the client device 102 via a network 104 (e.g., the media server 130, FIG. 1A).

In some implementations, when there are multiple input sources, such as cable TV, over the air TV, and satellite TV, channels from a particular input source are saved and stored in a respective channel lineup. For example, FIG. 2A illustrates two saved channel lineups 180-1 and 180-2. Also, in some implementations, to make the channel lineups more user-friendly and/or to identify channels that are duplicated across multiple lineups, the displayed and OCRed channel information is mapped to meaningful names/channel numbers, such as local over the air (OTA) channel numbers or channel names, such as network names (612). These meaningful channel names and numbers are then saved in the channel lineups along with the recognized displayed channel information. The information used to map the OCRed channel information to meaningful channel names and numbers can be previously stored on the client device 102 and/or downloaded from the server. Alternatively, the client device 102 can issue one or more requests to the server to map the channel information based on information available to the server for channel lineups available in the area of the client device 102 for different input sources/content providers.

Subsequent to deciding upon the status of the candidate channel, the method 600 includes determining whether or not to continue based on the suspected existence of additional channels (608). In some implementations, at least one addition candidate channel is suspected to exist when each of the candidate channels considered thus far has only been considered once and/or an equal number of times without overlap. If at least one more channel is not suspected to exist continue ("No" path from 608), the method 600 ends (610). If at least one more channel is suspected to exist continue ("Yes" path from 608), the method 600 includes selecting a new candidate channel and reiterating the portion of the method starting at block 602 (609). In some implementations, selecting a new candidate channel includes using the "channel up" (or "channel down") primary set-top box control command (609*a*). In some implementations, selecting a new candidate channel includes selecting a new channel from a list or the like (609*b*). In addition, the method described with reference to FIG. 6 (and the related methods described with reference to FIGS. 4 and 5) can be used to identify channel lineups available to viewers of non-subscription media content, such as over the air broadcasts that are received by a TV receiver, such as a TV receiver included, without limitation, in a computer, a media player, such as a DVD or Blu-ray player, or a digital video recorder (DVR).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A computer-implemented method of determining a channel line-up available through a primary TV receiver, comprising:
   at an electronic device configured to receive media programs, the electronic device including one or more processors and memory:
   identifying a plurality of candidate channels from a list;
   for each of the plurality of candidate channels:
      sending a respective control command to the primary TV receiver that tunes the primary TV receiver to the respective candidate channel;
      capturing respective display data provided by the primary TV receiver in response to the primary TV receiver receiving the respective control command;
      analyzing the respective display data to determine whether or not the respective candidate channel is delivering television content associated with a subscription corresponding to the electronic device, including analyzing signal strength of the respective candidate channel;
      when the respective channel is delivering television content associated with a subscription:
         transmitting a first respective code to the primary TV receiver to initiate display of a respective text overlay corresponding to the respective candidate channel;
         extracting respective text from the text overlay, wherein the respective text is associated with a respective media program delivered on the respective channel;
         transmitting a second respective code to the primary TV receiver to end display of the respective text overlay; and
         adding the respective channel and at least a portion of the corresponding respective text to the channel line-up;
      when the respective channel is delivering television content not associated with a subscription:
         not adding the respective channel to the channel line-up; and
   displaying the channel line-up to a user of the electronic device.

2. The method of claim 1, wherein capturing respective display data includes performing a screen capture from a display device configured to display channel data received from the primary TV receiver.

3. The method of claim 1, wherein capturing respective display data includes reading a display pixel buffer from at least one of the primary TV receiver and a display device.

4. The method of claim 1, wherein capturing respective display data includes decoding data transmitted by the primary TV receiver to a display device.

5. The method of claim 1, further comprising prior to displaying the channel line-up: for each channel in the channel line-up, confirming the respective channel against electronic program guide data.

6. The method of claim 1, wherein analyzing the respective display data comprises fingerprinting the respective display data to determine whether or not the respective candidate channel is delivering television content associated with a subscription through the primary TV receiver.

7. The method of claim 1, further comprising transmitting at least a portion of the extracted respective text to a media server to confirm identification of the respective media program.

8. A non-transitory computer readable storage medium storing one or more programs configured for execution by a computer, the one or more programs comprising instructions for:
   identifying a plurality of candidate channels from a list;
   for each of the plurality of candidate channels:
      sending a respective control command to the primary TV receiver that tunes the primary TV receiver to the respective candidate channel;
      capturing respective display data provided by the primary TV receiver in response to the primary TV receiver receiving the respective control command;
      analyzing the respective display data to determine whether or not the respective candidate channel is delivering television content associated with a subscription corresponding to the electronic device, including analyzing signal strength of the respective candidate channel;
      when the respective channel is delivering television content associated with a subscription:
         transmitting a first respective code to the primary TV receiver to initiate display of a respective text overlay corresponding to the respective candidate channel;
         extracting respective text from the text overlay, wherein the respective text is associated with a respective media program delivered on the respective channel;
         transmitting transmit a second respective code to the primary TV receiver to end display of the respective text overlay; and
         adding the respective channel and at least a portion of the corresponding respective text to the channel line-up;
      when the respective channel is delivering television content not associated with a subscription:
         not adding the respective channel to the channel line-up; and
   displaying the channel line-up to a user of the electronic device.

9. The non-transitory computer readable storage medium of claim 8, wherein capturing respective display data includes performing a screen capture from a display device configured to display channel data received from the primary TV receiver.

10. The non-transitory computer readable storage medium of claim 8, wherein capturing respective display data includes reading a display pixel buffer from at least one of the primary TV receiver and a display device.

11. The non-transitory computer readable storage medium of claim 8, wherein capturing respective display data includes decoding data transmitted by the primary TV receiver to a display device.

12. The non-transitory computer readable storage medium of claim 8, further comprising instructions that execute prior to displaying the channel line-up to confirm each channel in the channel line-up against electronic program guide.

13. The non-transitory computer readable storage medium of claim 8, wherein the one or more programs further comprise instruction for—transmitting at least a portion of the extracted respective text to a media server to confirm identification of the respective media program.

14. A system for determining a channel line-up available through a primary TV receiver, comprising:
   an electronic device configured to receive media programs, the electronic device including one or more processors and memory that stores instructions for execution by the one or more processors;
   wherein the memory includes instructions that, when executed by the processor, cause the system to:
   identify a plurality of candidate channels from a list;
   for each of the plurality of candidate channels:
      send a respective control command to a primary TV receiver that tunes the primary TV receiver to the respective candidate channel;
      capture respective display data provided by the primary TV receiver in response to the primary TV receiver receiving the respective control command;
      analyze the respective display data to determine whether or not the respective candidate channel is delivering television content associated with a subscription corresponding to the electronic device, including analyzing signal strength of the respective candidate channel;
      when the respective channel is delivering television content associated with a subscription:
         transmit a first respective code to the primary TV receiver to initiate display of a respective text overlay corresponding to the respective candidate channel;
         extract respective text from the text overlay, wherein the respective text is associated with a respective media program delivered on the respective channel;
         transmit a second respective code to the primary TV receiver to end display of the respective text overlay; and
         add the respective channel and at least a portion of the corresponding respective text to the channel line-up;
      when the respective channel is delivering television content not associated with a subscription:
         not add the respective channel to the channel line-up; and
   display the channel line-up to a user of the system.

15. The system of claim 14, wherein capturing respective display data includes performing a screen capture from a display device configured to display channel data received from the primary TV receiver.

16. The system of claim 14, wherein capturing respective display data includes reading a display pixel buffer from at least one of the primary TV receiver and a display device.

17. The system of claim 14, wherein the memory further includes instructions that execute prior to displaying the channel line-up to confirm each channel in the channel line-up against electronic program guide.

18. The system of claim 14, wherein the one or more programs further comprise instruction for transmitting at least a portion of the extracted respective text to a media server to confirm identification of the respective media program.

\* \* \* \* \*

UNITED STATES PATENT AND TRADEMARK OFFICE
CERTIFICATE OF CORRECTION

PATENT NO. : 9,832,413 B2  
APPLICATION NO. : 14/089709  
DATED : November 28, 2017  
INVENTOR(S) : Sandland et al.

Page 1 of 1

It is certified that error appears in the above-identified patent and that said Letters Patent is hereby corrected as shown below:

In the Claims

Claim 8, Column 17, Line 45, delete "transmitting transmit a" and insert --transmitting a--;

Claim 13, Column 18, Line 11, delete "for-transmitting" and insert --for transmitting--.

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*